United States Patent [19]

Cook

[11] 4,212,488
[45] Jul. 15, 1980

[54] FITTING FOR FLEXIBLE WALLED RECEPTACLE

[76] Inventor: Richard L. Cook, 444 Lake Mary Rd., Flagstaff, Ariz. 86001

[21] Appl. No.: 917,465

[22] Filed: Jun. 21, 1978

[51] Int. Cl.$^2$ ............................................. F16L 41/00
[52] U.S. Cl. ................................................... 285/200
[58] Field of Search .......................................... 285/200

[56] References Cited

U.S. PATENT DOCUMENTS

| 2,326,263 | 8/1943 | Steiner | 285/200 X |
| 2,366,442 | 1/1945 | Cunningham | 285/200 |
| 2,404,766 | 7/1946 | Hanson et al. | 285/200 X |
| 2,441,009 | 5/1948 | Cunningham | 285/200 |
| 2,459,747 | 1/1949 | Kolbe | 285/200 |
| 2,675,252 | 4/1954 | Haines | 285/200 |
| 3,537,732 | 11/1970 | Cook | 285/200 |

*Primary Examiner*—Thomas F. Callaghan
*Attorney, Agent, or Firm*—Herschel C. Omohundro

[57] ABSTRACT

This fitting is designed to be applied to a flexible walled tank, of the type employed in aircraft to hold fuel or other liquids, to provide a reinforced opening for receiving attachments, such as, connectors, gauges, pumps, conduits, and the like. The fitting is composed of a plurality of layers or plies of fabric reinforced elastic material, certain layers being mechanically connected to each other and all of the layers being adhesively joined at contacting overlapped portions into an integral unit. The layers are sized and shaped to give the unit inner and outer ring portions, the former being substantially solid and the latter having spaced flexible layers. Parts of the layers forming the inner ring portion of the unit have openings which are aligned to receive internally threaded elements for screws used to fasten the attachments to the fitting and hence to the tank. In installing the fitting in the tank wall, portions of the layers of such wall are disposed between the spaced flexible layers of the outer ring portion of the unit and the assembly is vulcanized. A rubber fuel barrier is molded over the inner ends of the fastening elements and inner edges of the inner ring portion to preclude leakage. The mechanical connection between the layers of the inner and outer ring portions transfers loads from the flexible tank wall to the substantially rigid inner ring portion and effectively resists separation or other failures.

19 Claims, 6 Drawing Figures

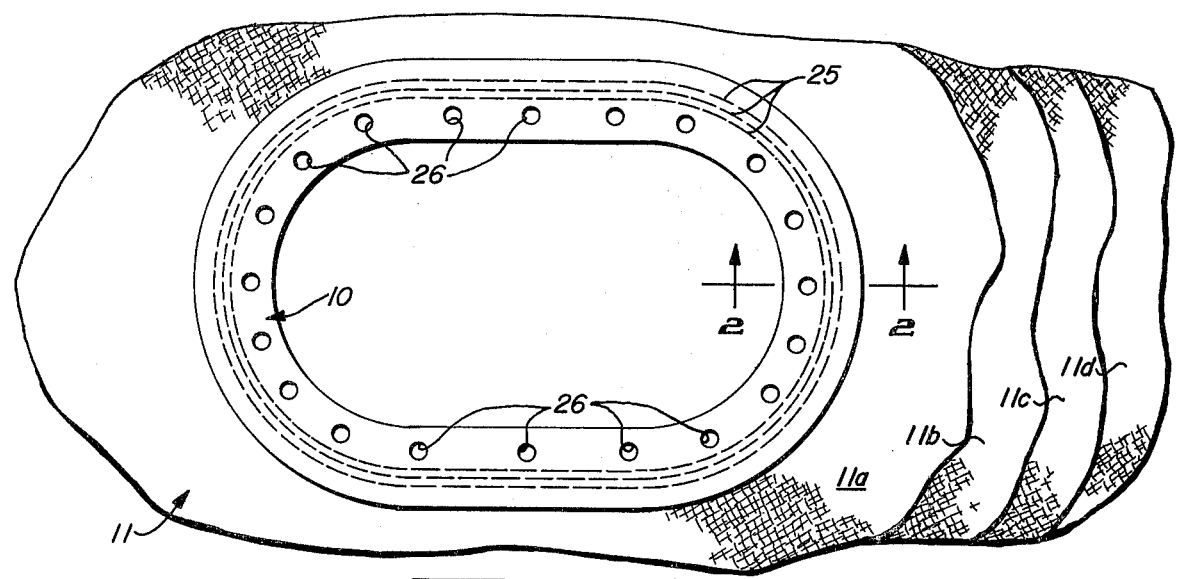
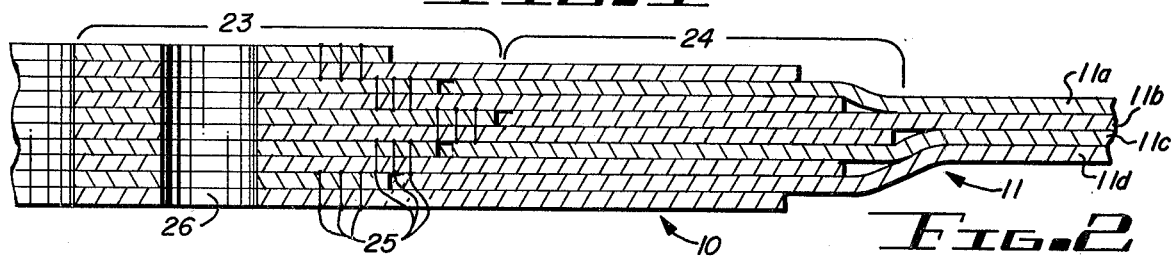
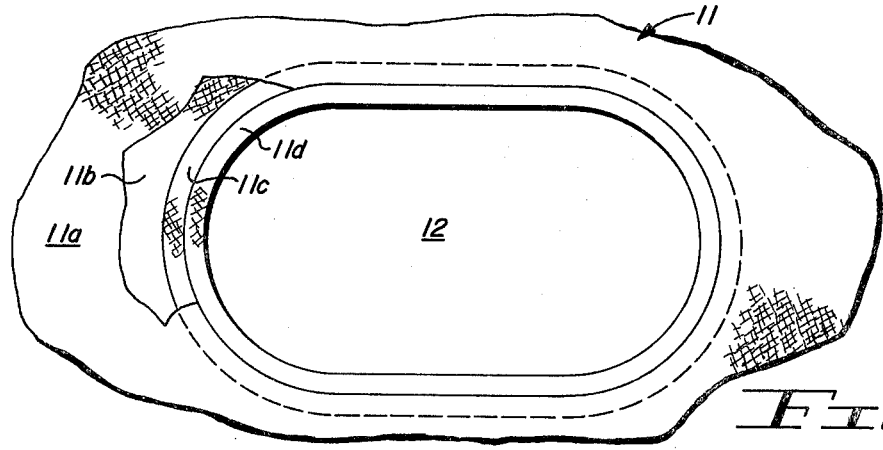
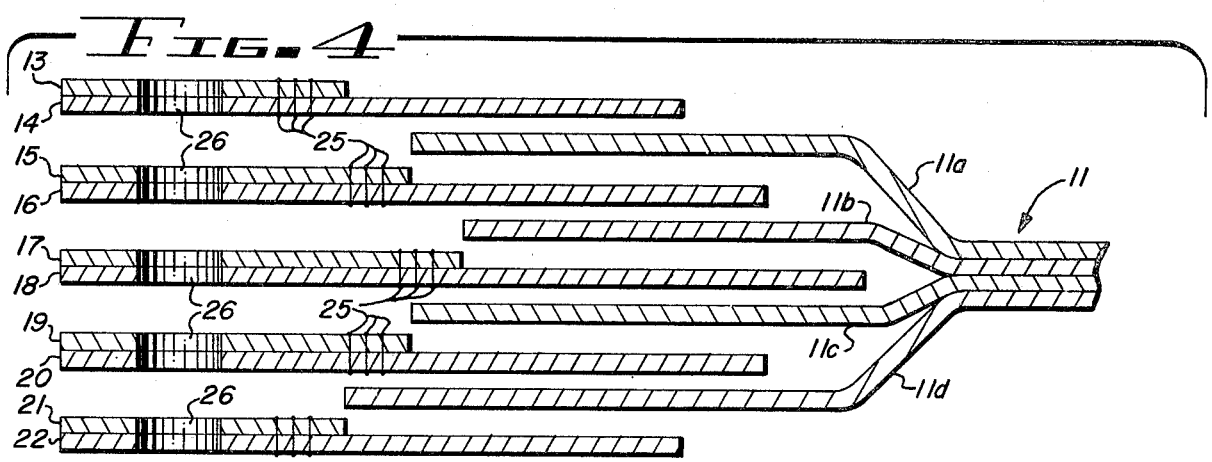

FITTING FOR FLEXIBLE WALLED RECEPTACLE

BACKGROUND OF THE INVENTION

In the formation of a flexible walled receptacle of the type employed as a fuel tank for aircraft, one particularly difficult problem is encountered. That problem is to provide a satisfactory connection between attachments, such as connectors, gauges, pumps, conduits, etc. and the tank. Since the tank walls are flexible such attachments, in previous constructions, have readily pulled loose due to the lack of a strong bond between the rigid material of the attachment and the elastic interface with the tank. Materials, such as Nylon, which have high elongation when stressed to even a small fraction of their ultimate strength, tend to stretch away from the interface bond when the bond substrate is rigid, causing a peel type failure at loads far below the basic material strength. Of many attempts to overcome the problem of transferring loads from a rigid fitting to an elastic bladder, only one has had significant success and it is exemplified by U.S. Pat. No. 3,537,732 to the present applicant. The fitting covered by such patent is capable of surmounting the load transfer problem but it is expensive and difficult to manufacture, it is excessively heavy, sparks may be generated and create an explosion hazard when the fitting is struck by high velocity projectiles, and large holes, through which fuel can escape, may be left after a bullet has struck. One of the aims of this invention is to avoid the aforementioned deficiencies.

The field of this invention is generally exemplified by the following patents:

| #2,366,442 | to Cunningham |
| #2,441,009 | to Cunningham |
| #2,772,101 | to Smith |
| #2,911,236 | to Thiboult |

SUMMARY OF THE INVENTION

As previously mentioned, this invention relates generally to flexible walled tanks of the type used in aircraft to hold fuel or other liquids. More particularly, the invention pertains to fittings provided on such tanks for connecting attachments, such as connectors, gauges, pumps, conduits, etc. thereto. A primary object of this invention is to provide a fitting which may be fabricated from readily available materials and which will be relatively light in weight, will be capable of transferring loads from an attachment to the tank with a minimum danger of pulling loose from the tank wall, and will include a minimum amount of metal.

Another object of the invention is to provide a fitting composed of a plurality of layers of fabric reinforced elastic material, the manner of construction and materials providing an inner ring portion having characteristics of a solid metal part and an outer ring portion substantially flexible in character, such portions being, in effect, mechanically connected so that loads may be transmitted from one to the other without tending to pull apart.

Another object of the invention is to provide a fitting composed of a plurality of pairs of layers of fabric reinforced elastic material having predetermined shapes, the layers of each pair being mechanically joined and the pairs being stacked in a predetermined manner and adhesively united to form an integral unit.

A further object is to provide the fitting referred to in the preceding paragraph in which the layers of the pairs are joined by stitching so that loads will be transmitted from one layer to the other with little or no tendency for relative movement thus avoiding destructive loads on the adhesive connections between the layers.

A still further object is to provide the fitting referred to in the two preceding paragraphs with one layer of each pair composed of a material having a different modulus of elasticity than the material of the other layer, the pairs being stacked in such a manner that the layers of a predetermined modulus of elasticity will provide a first ring portion with a substantially rigid characteristic, the other layers forming a second ring portion with a flexible character approximating that of the tank wall to which the fitting is to be attached. The first ring portion with the rigid characteristic is thus capable of connection to a metallic attachment without flexing away therefrom during normal service or under crash loads while the other ring portion can be adhesively joined or vulcanized to the tank wall and flex therewith, still being capable of full load transfer from the tank wall to the first ring portion through the stitched joint.

A further object of the invention is to form the plies or layers with configurations such that when the layers are stacked and joined the resulting fitting will be relatively thin and light in weight yet possess the strength necessary to fully transfer loads from the tank wall to the attachment and vice versa.

A still further object of the invention is to provide the plies or layers with a series of openings which when the layers are stacked will register with one another to form holes for the reception of acorn nuts to receive screws used to mechanically connect a selected attachment to the tank, a fuel barrier being molded or otherwise applied to the inner side of the fitting over the acorn nuts and edges of the plies to prevent leakage of the fuel.

Other objects and advantages of the invention will be set forth in or be made obvious by the following description of one form of the invention selected for illustration in detail in the accompanying drawings.

IN THE DRAWINGS

FIG. 1 is a plan view of a portion of a wall of a flexible walled tank in which a fitting formed in accordance with the invention has been incorporated;

FIG. 2 is a sectional view taken through the edge of the tank wall and fitting on a plane indicated by the line 2—2 of FIG. 1;

FIG. 3 is a plan view of a portion of a wall of a flexible walled tank showing an initial opening for the reception of a fitting formed in accordance with the invention, portions of the wall being broken away to show the overlapping layers;

FIG. 4 is a detailed sectional view taken through the edge of a fitting and the adjoining edge of the wall, the layers of the fitting and wall being separated to illustrate features of construction;

DESCRIPTION OF THE INVENTION

Figure 5:
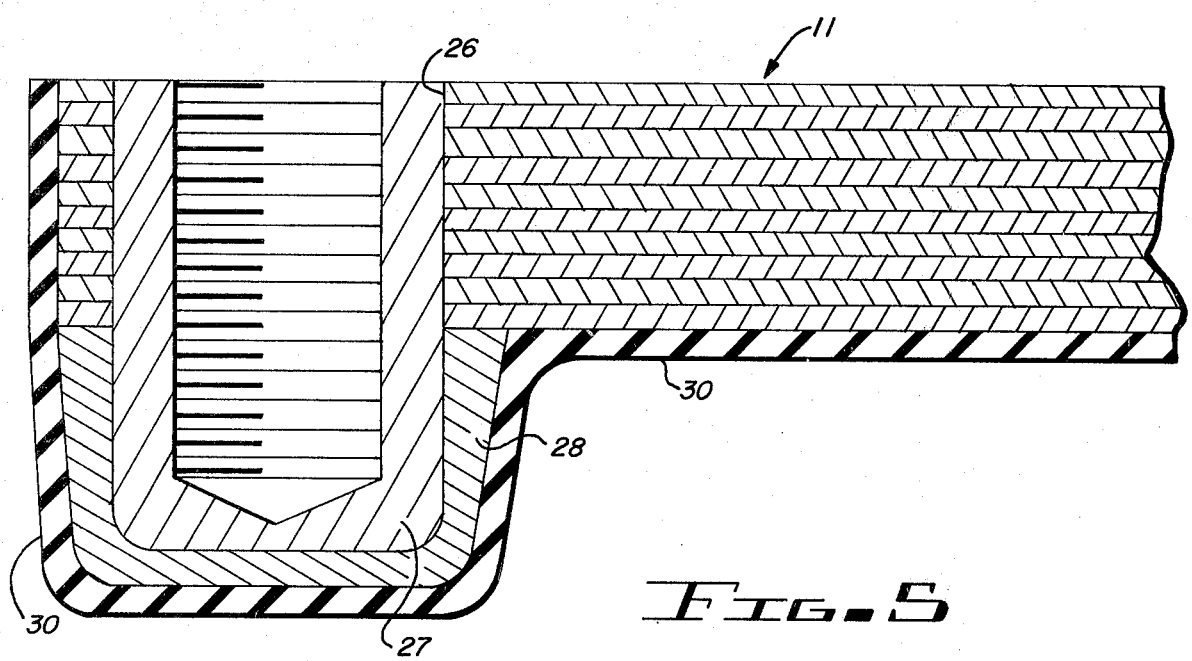
FIG. 5 is a sectional view taken through the edge portion of a fitting installed in a tank wall, the view showing a nut incorporated in the fitting.

Particular reference to FIG. 1 of the drawing will show that the fitting, designated generally by the numeral 10, is incorporated in a wall 11 of a flexible walled tank. As indicated in FIGS. 2, 3, and 4, wall 11 is composed of a plurality of layers 11a, 11b, 11c, and 11d of fabric reinforced elastic material, such as Nylon. While four layers of the material have been shown, the number may vary in accordance with the desires of the tank manufacturer and/or the requirements of the tank. Also, as shown in FIGS. 2, 3, and 4, wall 11 is formed with an opening 12 for the reception of the fitting 10. The latter may constitute and be handled as a separate item of manufacture and sale if desired. In certain instances, and for reasons which will appear hereinafter, the holes in the layers of wall which form the opening 12 may be of slightly different sizes so that the outer edges of such layers are disposed in staggered relation as best shown in FIGS. 2, 3, and 4.

Figure 6:
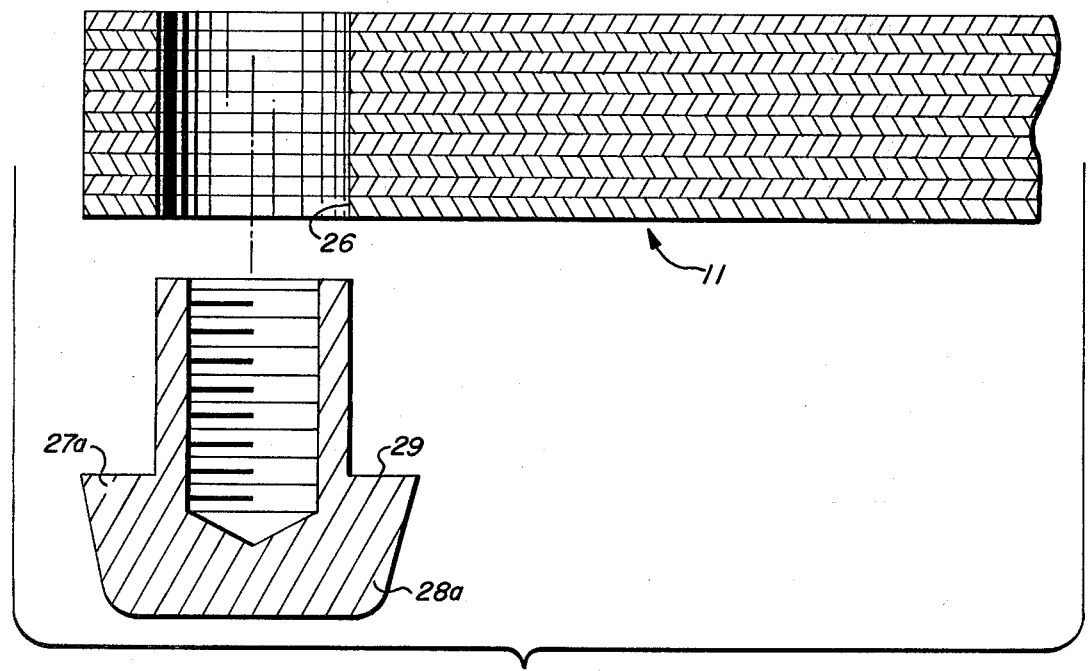
FIG. 6 is a similar view illustrating a modified form of nut which may be employed.

FIGS. 2 and 4 show that the fitting 10 comprises a plurality of layers 13 to 22, inclusive, of fabric reinforced elastic. The layers are shaped, joined, and treated to provide the fitting with inner and outer ring portions 23 and 24, respectively. Certain of the layers making up the inner ring portion are made of a different, though similar, material than the layers making up the outer ring portion. If desired, the layers of the outer ring portion could be made of the same material as the tank wall 11. Certain layers of the inner ring portion are preferably made of a material, such as "Kevlar 49" which has a different modulus of elasticity than the other layers and will give the inner ring portion some characteristics of a rigid body. Layers 13 to 22, inclusive, are arranged in pairs, each pair having one small layer and one larger layer. In the form of fitting shown, for illustration only, the layers are of oval configuration and the opening in the tank wall is similar. The small layers 13, 15, 17, 19, and 21 are made from the material with the greater ability to resist stress; the larger layers 14, 16, 18, 20, and 22 are made from material with elasticity similar to the tank wall material. The layers of each pair, as shown in FIG. 4, are mechanically united by one or more rows of stitching 25 arranged parallel and in close proximity to the edge of the smaller layer. If desired, the layers of each pair are coated with adhesive prior to the sewing or stitching operation. After the pairs are stitched and the adhesive is cured, the required number of pairs are stacked, as indicated in FIGS. 2 and 4, to form the fitting. In forming the layers 13 to 22 included, a row of holes 26 is provided adjacent to the inner edge of each. When the layers are stacked these holes will be aligned to receive internally threaded metallic acorn or dome nuts 27, the open ends of the threaded portions facing toward the surface of the fitting which will be on the outside of the tank. These nuts receive the screws (not shown) employed to connect an attachment to the tank. FIGS. 5 and 6 show two forms of nuts 27 and 27a. The former may be made from straight rod and have a suitable head molded or otherwise provided thereon. Nut 27a may be turned from a slightly larger rod to leave a head 28a which in turn forms a shoulder 29 for engaging the upper surface of the top ply or layer 13 of the inner ring portion of the fitting.

When the pairs of layers or plies are stacked and the acorn nuts are inserted, a rubber fuel barrier 30 is applied to the surface of the inner ring portion which will finally be disposed within the finished tank. The barrier 30 will also extend over the inner edges of the plies forming the inner ring portion. During the stacking of the plies, the insertion of the acorn nuts, and the application of the fuel barrier, use may be made of a suitable adhesive to retain the parts as an integral unit for insertion into the opening 12 of the tank upon final assembly thereof.

In the performance of the latter step, the plies 11a, 11b, 11c, and 11d are inserted between the respective plies 14, 16, 18, 20, and 22 of the outer ring portion of the fitting. It will be noted from FIG. 4, that edges of the wall plies immediately adjacent the opening 12 will substantially abut the outer edges of the plies 15, 17, 19, and 21 of the inner ring portion. The overlapping plies are treated with an adhesive prior to assembly and the fitting will then be made an integral part of the tank by vulcanization.

It will be noted that due to the mechanical connection of the larger and smaller plies forming the outer and inner ring portions, respectively, of the fitting, stress loads will be transmitted directly between the tank wall and the attachment secured to the fitting. There will thus be no tendency of the tank wall to tear away or separate from the inner ring portion.

The graduated sizes of the plies composing the inner and outer ring portions and the holes forming the opening 12 in the tank wall tend to smooth out and eliminate sharp abutments in the tank wall around the attachment fitting. The formation of the inner and outer ring portions from stacked layers of fabric reinforced elastic material minimizes the thickness of the fitting and still imparts adequate strength thereto. By using primarily non-metallic parts, the tendency for the creation of sparks and resulting explosions is radically reduced.

I claim:
1. A fitting for a receptacle of the type having a flexible wall with a plurality of layers comprising:
   (a) a unit composed solely of a plurality of plies of sheet material of relatively different degrees of elasticity, the plies being of predetermined shape, of varying sizes, stacked and adhesively united to form inner and outer ring portions, the inner ring portion being substantially rigid and the outer ring portion having the plies thereof spaced to receive and overlap the layers of the receptacle wall, the plies forming the outer ring portion being mechanically connected to certain plies of the inner ring portion, the stacked plies forming the inner ring portion having registering openings for the reception of fastening elements.
2. The fitting for a flexible walled receptacle of claim 1 in which the sheet material from which the plies are formed is fabric reinforced.
3. The fitting for a flexible walled receptacle of claim 1 in which predetermined plies of the inner ring portion are mechanically connected by stitching them together.
4. The fitting for a flexible walled receptacle of claim 1 in which the material of certain plies forming said unit has a different modulus of elasticity than the material of the other plies.
5. The fitting for a flexible walled receptacle of claim 1 in which the inner ring portion of the unit is composed of parts of all plies in said unit overlapped to render the inner ring portion substantially solid and the outer ring portion includes only spaced predetermined parts of certain plies.

6. The fitting for a flexible walled receptacle of claim 1 in which internally threaded fastener elements are disposed in the registering openings in the stacked plies of said inner ring portion.

7. The fitting for a flexible walled receptacle of claim 4 in which the plies of sheet material of different elasticity are arranged in pairs, the plies of each pair being of different sizes and mechanically connected together, the inner ring portion being formed of the overlapped smaller plies and the adjacent parts of the larger plies, the outer ring portion being composed of the remaining parts of the larger plies.

8. The fitting for a flexible walled receptacle of claim 5 in which the overlapped parts of the plies of elastic sheet material forming the inner ring portion have a row of aligned holes adjacent the inner edge of the ring portion, and internally threaded fastener elements are disposed in said aligned holes.

9. The fitting for a flexible walled receptacle of claim 7 in which the plies of each pair are stitched together adjacent the outer edge of the smaller ply.

10. The fitting for a flexible walled receptacle of claim 7 in which the sizes of the pairs of plies are graduated, the larger size pairs being disposed between the smaller size pairs when the pairs are stacked.

11. The fitting for a flexible walled receptacle of claim 1 in which the plies of elastic sheet material have an oval ring-like configuration with a row of openings adjacent the inner edge for receiving the fastener elements.

12. The fitting for a flexible walled receptacle of claim 8 in which the fastener elements have shoulder means for engaging one surface of the inner ring portion to resist dislocation of the fastener element during use.

13. The fitting for a flexible walled receptacle of claim 6 in which an elastic fuel barrier is applied over the inner ends of the threaded fastener elements and the adjoining edges of the elastic sheet material.

14. A fitting for a receptacle of the type having a flexible wall with a plurality of layers having openings for the reception of the fitting comprising:
(a) a first group of ring-like pieces of sheet material with relatively low elasticity of predetermined sizes;
(b) a second group of similarly shaped pieces of sheet material with a higher degree of elasticity of sizes larger than the pieces of said first group, the pieces of said groups being stacked alternately relative to size to provide an inner ring portion composed of the inner parts of the pieces of the second group and the pieces of the first group, the stacking also providing an outer ring portion composed only of the outer parts of the pieces of the second group, such outer parts being spaced from one-another to receive parts of the layers of the flexible wall of the receptacle surrounding the openings therein, the pieces of the elastic sheet material forming the first and second groups having openings registering in the stacked condition of the pieces for the reception of fastening elements.

15. The fitting for a flexible walled receptacle of claim 14 in which the material from which the first group of ring-like pieces are formed has a different modulus of elasticity than the material from which the second group of ring-like pieces are formed.

16. The fitting for a flexible walled receptacle of claim 14 in which each piece of the first group of ring-like pieces has a piece from the second group of pieces secured thereto by at least one row of stitches disposed adjacent the edge of the piece from the first group.

17. The fitting for a flexible walled receptacle of claim 14 in which the sizes and shapes of the pieces of the first group conform substantially to the sizes and shapes of the openings in the layers of the flexible wall of the receptacle so that when the layers of the flexible wall are disposed in the spaces between the outer parts of the pieces of the second group the edges of the layers of the flexible wall will substantially abut the outer edges of the pieces of the first group.

18. The fitting for a flexible walled receptacle of claim 16 in which the openings for the fastening elements are disposed between the row of stitches and the inner edges of the pieces of said first and second groups.

19. A fitting for a receptacle of the type having a flexible wall with a plurality of layers in which openings for the reception of the fitting are formed, the fitting comprising in its entirety: first and second groups of similarly shaped ring-like pieces of elastic sheet material, the pieces of the first group being of smaller sizes than the pieces of the second group, said pieces being selected alternately from said groups and stacked to form an inner ring portion consisting of all the pieces from the first group and the center parts of the pieces from the second group and an outer ring portion consisting of the outer parts of the pieces from the second group, the pieces composing the outer ring portion being spaced from one another to receive and overlap the layers of the flexible wall of the receptacle around the openings therein; and internally threaded fastener elements disposed in the inner ring portion around the inner edge thereof.

* * * * *